(12) United States Patent
Umeyama

(10) Patent No.: US 7,719,607 B2
(45) Date of Patent: May 18, 2010

(54) ELECTRONIC DEVICE SYSTEM AND ELECTRONIC CAMERA SYSTEM

(75) Inventor: Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 772 days.

(21) Appl. No.: 11/188,941

(22) Filed: Jul. 26, 2005

(65) Prior Publication Data

US 2006/0033836 A1 Feb. 16, 2006

(30) Foreign Application Priority Data

Aug. 13, 2004 (JP) ............................. 2004-236012

(51) Int. Cl.
H04N 5/225 (2006.01)
H04N 5/76 (2006.01)
H02J 7/00 (2006.01)

(52) U.S. Cl. ................. 348/372; 348/231.7; 348/207.1; 348/373; 320/106

(58) Field of Classification Search ............. 348/231.7, 348/371–373, 207.1; 320/106
See application file for complete search history.

(56) References Cited

U.S. PATENT DOCUMENTS

| | | | | | |
|---|---|---|---|---|---|
| 5,006,881 | A | * | 4/1991 | Kodama | 396/176 |
| 5,600,230 | A | * | 2/1997 | Dunstan | 340/636.13 |
| 6,101,339 | A | * | 8/2000 | Miki et al. | 396/301 |
| 6,151,652 | A | * | 11/2000 | Kondo et al. | 713/300 |
| 6,212,410 | B1 | * | 4/2001 | Ishida | 455/572 |
| 6,384,572 | B1 | * | 5/2002 | Nishimura | 320/106 |
| 6,835,491 | B2 | * | 12/2004 | Gartstein et al. | 429/92 |
| 6,956,613 | B2 | * | 10/2005 | Fujisawa | 348/372 |
| 7,064,522 | B2 | * | 6/2006 | Nawa et al. | 320/132 |
| 7,227,333 | B2 | * | 6/2007 | Yamada et al. | 320/106 |
| 7,354,301 | B2 | * | 4/2008 | Noguchi et al. | 439/500 |
| 7,439,707 | B2 | * | 10/2008 | Shigeeda | 320/106 |
| 2003/0102842 | A1 | * | 6/2003 | Tamai et al. | 320/106 |
| 2003/0179302 | A1 | * | 9/2003 | Harada et al. | 348/231.6 |
| 2004/0004671 | A1 | * | 1/2004 | Takahashi | 348/375 |
| 2004/0032490 | A1 | * | 2/2004 | Uchida | 348/96 |
| 2004/0041913 | A1 | * | 3/2004 | Takasumi et al. | 348/207.2 |

(Continued)

FOREIGN PATENT DOCUMENTS

CN 1512620 A 7/2004

(Continued)

OTHER PUBLICATIONS

Oct. 20, 2009 Office Action issued in Japanese patent application No. 2004-236012 (with translation).

(Continued)

*Primary Examiner*—Tuan Ho
*Assistant Examiner*—Marly Camargo
(74) *Attorney, Agent, or Firm*—Oliff & Berridge, PLC

(57) ABSTRACT

The invention provides an electronic camera system which operates an electronic camera in a minimum power mode when a not-genuine secondary battery is attached to the electronic camera. Namely, for the electronic camera which uses a detachable secondary battery as a power source, it determines from identification information whether the secondary battery is a genuine battery of the electronic camera. When determining that the secondary battery is a genuine battery, the electronic camera system allows the electronic camera to normally operate. When determining that the secondary battery is not a genuine battery, it places the electronic camera into the minimum power mode.

5 Claims, 5 Drawing Sheets

U.S. PATENT DOCUMENTS

| | | | |
|---|---|---|---|
| 2004/0165101 A1* | 8/2004 | Miyanari et al. | 348/363 |
| 2005/0035738 A1* | 2/2005 | Patino et al. | 320/106 |
| 2005/0092824 A1* | 5/2005 | Hindermeyer et al. | 235/375 |
| 2007/0050627 A1* | 3/2007 | Chiku | 713/176 |
| 2007/0072014 A1* | 3/2007 | Kim et al. | 429/7 |
| 2007/0164703 A1* | 7/2007 | Noguchi et al. | 320/107 |
| 2007/0214296 A1* | 9/2007 | Takamatsu et al. | 710/63 |
| 2008/0014482 A1* | 1/2008 | Yamamiya | 429/19 |
| 2008/0074535 A1* | 3/2008 | Ohsuga et al. | 348/371 |
| 2008/0176121 A1* | 7/2008 | Yamamiya | 429/24 |

FOREIGN PATENT DOCUMENTS

| | | |
|---|---|---|
| JP | A-11-73247 | 3/1999 |
| JP | A 2002-280044 | 9/2002 |
| JP | A-2003-168490 | 6/2003 |
| JP | A-2003-195398 | 7/2003 |
| JP | A 2004-6524 | 1/2004 |
| JP | A 2004-96919 | 3/2004 |
| JP | A-2004-150847 | 5/2004 |

OTHER PUBLICATIONS

Nov. 6, 2009 Office Action issued in Chinese patent application No. 2005100914812 (with translation).

* cited by examiner

ELECTRONIC DEVICE SYSTEM AND ELECTRONIC CAMERA SYSTEM

CROSS REFERENCE TO RELATED APPLICATION

This application is based upon and claims the benefit of priority from Japanese Patent Application No. 2004-236012, filed on Aug. 13, 2004, the entire contents of which are incorporated herein by reference.

BACKGROUND OF THE INVENTION

1. Field of the Invention

The present invention relates to an electronic device system and an electronic camera system to/from which a secondary battery is attached/detached. It particularly relates to an electronic device system and an electronic camera system suitable for preventing occurrence of accidents such as an explosion of a secondary battery and thereby preventing destruction of an electronic device and an electronic camera to which the secondary battery is attached, to ensure their users' safety.

2. Description of the Related Art

In recent years, a secondary battery such as a nickel-hydrogen battery, lithium-ion battery, or the like has been widely used as a battery to drive an electronic device such as an electronic camera because of its excellent economic efficiency.

Moreover, in order to extend the discharge time of the secondary battery, the realization of the higher-capacity secondary battery has been planned. Therefore, the energy storage amount per unit volume of the secondary battery has been increasing. Due to an increase in the internal temperature of the secondary battery along with overcharge, overdischarge, and so on, and an increase in the internal pressure of the secondary battery, the secondary battery may explode (See Japanese Unexamined Patent Application Publication No. 2004-96919).

To prevent such accidents as the explosion of the secondary battery, it is proposed to provide a protection circuit in the secondary battery (See Japanese Unexamined Patent Application Publication No. 2004-6524).

An example of the protection circuit of the secondary battery adopts a PTC (Positive Temperature Coefficient) thermistor in the protective circuit. For example, if an excessive current flows into the secondary battery and into the PTC thermistor, the resistance value of the PTC thermistor increases. Consequently, the current which flows into the PTC thermistor is restricted. This can inhibit overcharge and the like to the secondary battery, and accordingly prevent the explosion of the secondary battery due to an increase in the internal temperature of the secondary battery with the overcharge and an increase in the internal pressure thereof. Note that the PTC thermistor has a property that its resistance value decreases as the temperature decreases. Hence, the PTC thermistor is useful as a reusable nondestructive protective component.

Further, the internal temperature of the secondary battery is detected as a value of a current, and the detected current is allowed to flow into the PTC thermistor. As a result, when the internal temperature of the secondary battery increases and a large current flows, the resistance value of the PTC thermistor increases, thereby limiting the current flowing into the PTC thermistor. There has been proposed another technique of using this current restriction as a trigger to open an explosion preventing valve provided in the secondary battery and decrease the internal pressure thereof for the explosion prevention.

Furthermore, there has been proposed a technique of using a detachable fuel cell from a power source of the electronic device. In this case, it is important to ensure the safety of the electronic device and the fuel cell. In order to achieve this, there has been another technique of allowing the attachment of the fuel cell to the electronic device after confirming that the fuel cell attached to the power source section is a genuine part of the electronic device (See Japanese Unexamined Patent Application Publication No. 2002-280044).

In the prior arts, the protection circuit is provided in the secondary battery for prevention of the explosion of the electronic device with the secondary battery attached, so as to ensure their users' safety the explosion of the secondary battery.

However, in the world today, there are many so-called imitative batteries with no protection circuit provided.

Also, there are secondary batteries provided with the protection circuit which are not ones designed exclusively for the electronic device (hereinafter called a genuine battery) but non-genuine batteries.

If the above-described imitative batteries or non-genuine secondary batteries are attached to the electronic device such as a camera, there may cause not only the explosion of the secondary battery but also harm to a body of the electronic device and its user because it is not preventable of the increase in the internal temperature, the internal pressure and the like of the secondary battery. Accordingly, in the electronic device such as the electronic camera, it is necessary to exclude these imitative batteries and non-genuine secondary batteries with an unqualified protection circuit.

SUMMARY OF THE INVENTION

It is an object of the present invention to provide an electronic device system and an electronic camera system which allows an electronic device such as an electronic camera to perform a normal operation when a genuine secondary battery is attached thereto and make it possible to limit the operation of the electronic device such as the electronic camera to a minimum when a not-genuine secondary battery is attached thereto.

It is another object of the present invention to provide an electronic camera system which makes it possible to display a state of a secondary battery when an electric camera equipped with the secondary battery is connected to a personal computer.

An electronic device system of the present invention has a detachable and chargeable secondary battery, and it includes: a secondary battery determination part which determines whether the secondary battery is a genuine battery which is designed appropriate for an electronic device from identification information; a normal control part which allows the electronic device to operate normally when the secondary battery determination part determines that the second battery is genuine battery; and a minimum power mode shifting part which shifts the operation of the electronic device to a minimum power mode when the secondary battery determination part determines that the secondary battery is not a genuine battery.

Further, in the electronic device system of the present invention, the secondary battery determination part detects a state of the secondary battery at regular periods.

An electronic camera system of the present invention includes: a secondary battery determination part which determines whether a secondary battery is a genuine battery which is designed appropriate for an electronic camera from identification information; a normal control part which allows the electronic camera to operate normally when the secondary battery determination part determines that the second battery is a genuine battery; and a minimum power mode shifting part which shifts the operation of the electronic camera to a minimum power mode when the secondary battery determination part determined that the secondary battery is not a genuine battery.

Further, in the electronic camera system of the present invention, the secondary battery determination part detects a state of the secondary battery at regular periods. Furthermore, the secondary battery determination part transmits the detected state of the secondary battery to a personal computer, and the personal computer displays the detected state of the secondary battery upon receiving.

According to the present invention, it is possible for the electronic device such as the electronic camera to perform normal operation when the secondary battery as the genuine battery is attached thereto, and it is possible to limit the operation of the electronic device such as the electronic camera to a minimum when a not-genuine secondary battery is attached. As a result, it is preventable of an explosion of the secondary battery, a breakage of a body of the electronic camera or the electronic device, and any harm to its user.

Moreover, according to the present invention, it is possible to display the state of the secondary battery on the personal computer.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

An embodiment of the present invention will be described below.

Figure 1:
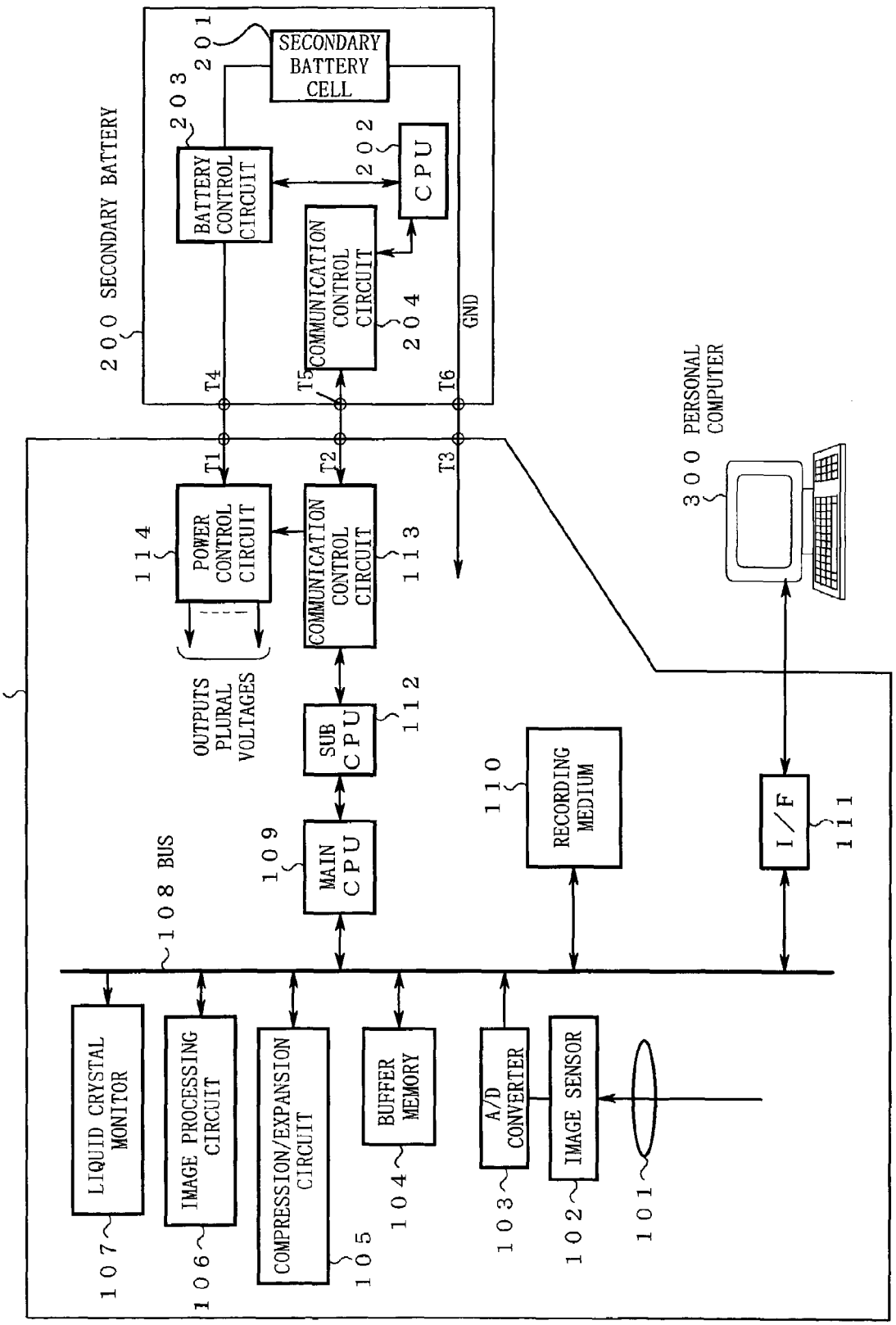
FIG. 1 is a block diagram showing an embodiment of the present invention.

FIG. 1 is a block diagram showing the embodiment of the present invention. This embodiment applies the present invention to an electronic camera and corresponds to all claims described in CLAIMS.

In FIG. 1, numeral 100 denotes an electronic camera, numeral 200 denotes a secondary battery, and numeral 300 denotes a personal computer.

A photographing system of the electronic camera 100 is well known, so that portions related to this embodiment will be briefly explained.

The electronic camera 100 performs various controls, including a preliminary control before photographing, and executes photographing based on these controls.

Namely, as shown, a photographing lens 101 is placed inside the electronic camera 100, and an image sensor 102 such as a CCD is placed at a position where an optical image obtained via the photographing lens 101 is received.

An output of the image sensor 102 is converted into a digital signal via an A/D converter 103 and inputted to a bus 108.

Connected to the bus 108 are a buffer memory 104, a compression/expansion circuit 105, an image processing circuit 106, a liquid crystal monitor 107, a recording medium 110, and an interface (denoted as I/F in FIG. 1) 111, respectively. Among them, the image processing circuit 106 is a well-known circuit to perform signal processings such as gamma processing, gray level correction, and the like in sequence.

A main CPU 109 controls the buffer memory 104, the compression/expansion circuit 105, the image processing circuit 106, and so on and stores images captured by the image sensor 102 as image data in the recording medium 110.

As shown in FIG. 1, a secondary battery 200 is attached to the electronic camera 100 via terminals T1 to T6.

The secondary battery 200 includes a secondary battery cell 201, a CPU 202, a battery control circuit 203, and a communication control circuit 204.

A nickel-hydrogen battery, a lithium-ion battery, or the like is commonly used as the second battery cell 201.

The CPU 202 transmits an identification code, battery information, and the like of the secondary battery to the electronic camera 100 through the communication control circuit 204. Here, the identification code corresponds to identification information set forth in a claim. The battery information signifies the nominal capacity, maximum charging voltage, maximum discharging current, maximum temperature during discharge, date of manufacture, cycle count (the number of charges made until a full charge), number of charges (the number of charges made before a full charge), and so on.

The battery control circuit 203 monitors and controls an output voltage and an output current of the secondary battery cell 201 based on a command of the CPU 202.

The CPU 202 checks a secondary battery remaining capacity through the battery control circuit 203 and transmits it to the electronic camera 100 through the communication control circuit 204. Further, the CPU 202 has a function of, when the secondary battery cell 201 is brought into an overcurrent output state, an overvoltage output state, or a low voltage output state, transmitting the state to the electronic camera 100 through the communication control circuit 204. Here, the secondary battery remaining capacity, the overcurrent output state, the overvoltage output state, and so on are also included in the above-described battery information.

A sub CPU 112 of the electronic camera 100 receives communication from the secondary battery 200 through a communication control circuit 113.

The electronic camera 100 receives electric power supplied from the battery control circuit 203 in the secondary battery 200 through a power control circuit 114. Incidentally, a line which is directly inputted from the secondary battery cell 201 to the electronic camera 100 is aground-level (GND) line.

The power control circuit 114 of the electronic camera 100 receives the supplied power and outputs plural voltages needed in respective sections of the electronic camera. It outputs, for example, plural voltages between 6 V to 8.4 V, a negative voltage, and so on. By these voltages, the electronic camera performs photographing processing, reproducing processing, and so on.

Moreover, as shown in FIG. 1, the personal computer 300 is connected to the electronic camera 100 via the interface (I/F) 111. A USB or the like is commonly used as the interface 111.

Figure 2:
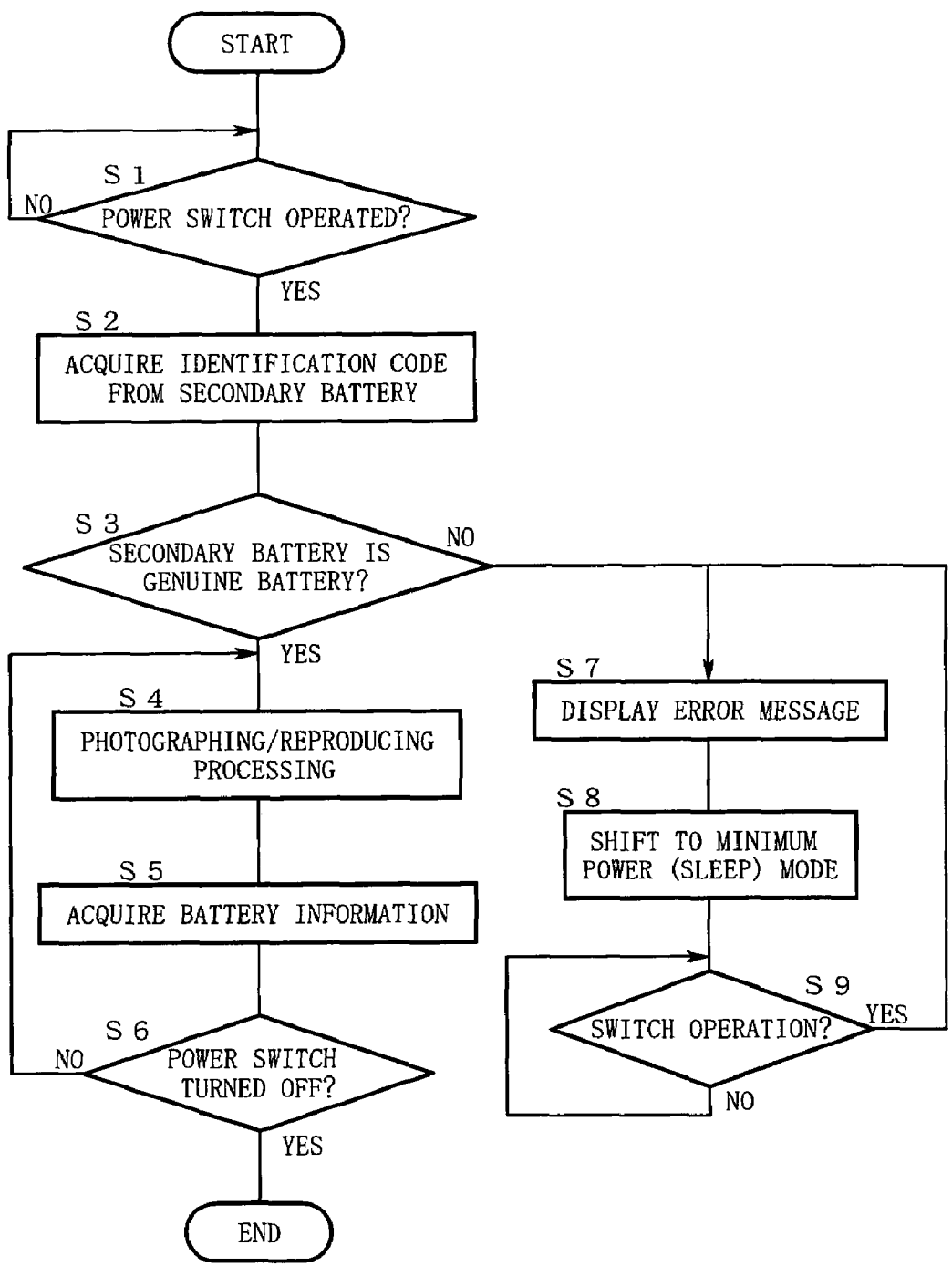
FIG. 2 is a flowchart showing a first operational example of the embodiment shown in FIG. 1.

FIG. 2 is a flowchart showing a first operational example of the embodiment shown in FIG. 1.

In step S1, the main CPU 109 determines whether a power switch of the electronic camera 100 has been operated. If it is determined that the power switch has been operated, operation proceeds to step S2.

In step S2, the main CPU 109 acquires an identification code from the secondary battery 200.

In step S3, the main CPU 109 determines whether the secondary battery 200 is a genuine battery based on the identification code. If it is determined that the secondary battery 200 is the genuine battery, the operation proceeds to step S4, and if it is determined that it is a non-genuine battery, the operation proceeds to step S7. Here, assuming that it is determined that the secondary battery 200 is the genuine battery, the operation proceeds to step S4.

In step S4, the electronic camera 100 performs a normal operation, including the photographing processing and the reproducing processing, and thereafter the operation proceeds to step S5.

In step S5, the main CPU 109 of the electronic camera 100 acquires battery information through the sub CPU 112. Note that in the operation of this embodiment, a description is made on step S5 performed after step S4 for simplicity. However, the present invention is not limited thereto, and the battery information is normally acquired every fixed time.

In step S6, the main CPU 109 determines whether the power switch has been turned off. If it is determined that the power switch has been turned off, the process ends. If it is determined that the power switch has not been turned off, the process in steps S4 to S6 is repeated.

Next, a case where in step S3, it is determined that the secondary battery 200 is the non-genuine battery will be explained. In this case, the operation proceeds to step S7.

In step S7, the main CPU 109 displays an error message on the liquid crystal monitor 107 of the electronic camera 100. As the error message, for example, "the battery cannot be authenticated", "this battery cannot be used" or the like is possible.

Then, in step S8, the main CPU 109 shifts to a minimum power (sleep) mode. Thereby, all other processings, except switch operation processing, cannot be executed. Consequently, the liquid crystal monitor 107 blacks out.

In step S9, the main CPU 109 determines whether a switch operation has been performed. If it is determined that the switch operation has been performed, the process in steps S7 to S9 is repeated again.

According to the embodiment shown in FIG. 1 and FIG. 2, when the non-genuine secondary battery is attached, the electronic camera 100 shifts to the minimum power (sleep) mode. Accordingly, it is possible to exclude the non-genuine secondary battery and thereby ensure the safety of the electronic camera and its user.

Figure 3:
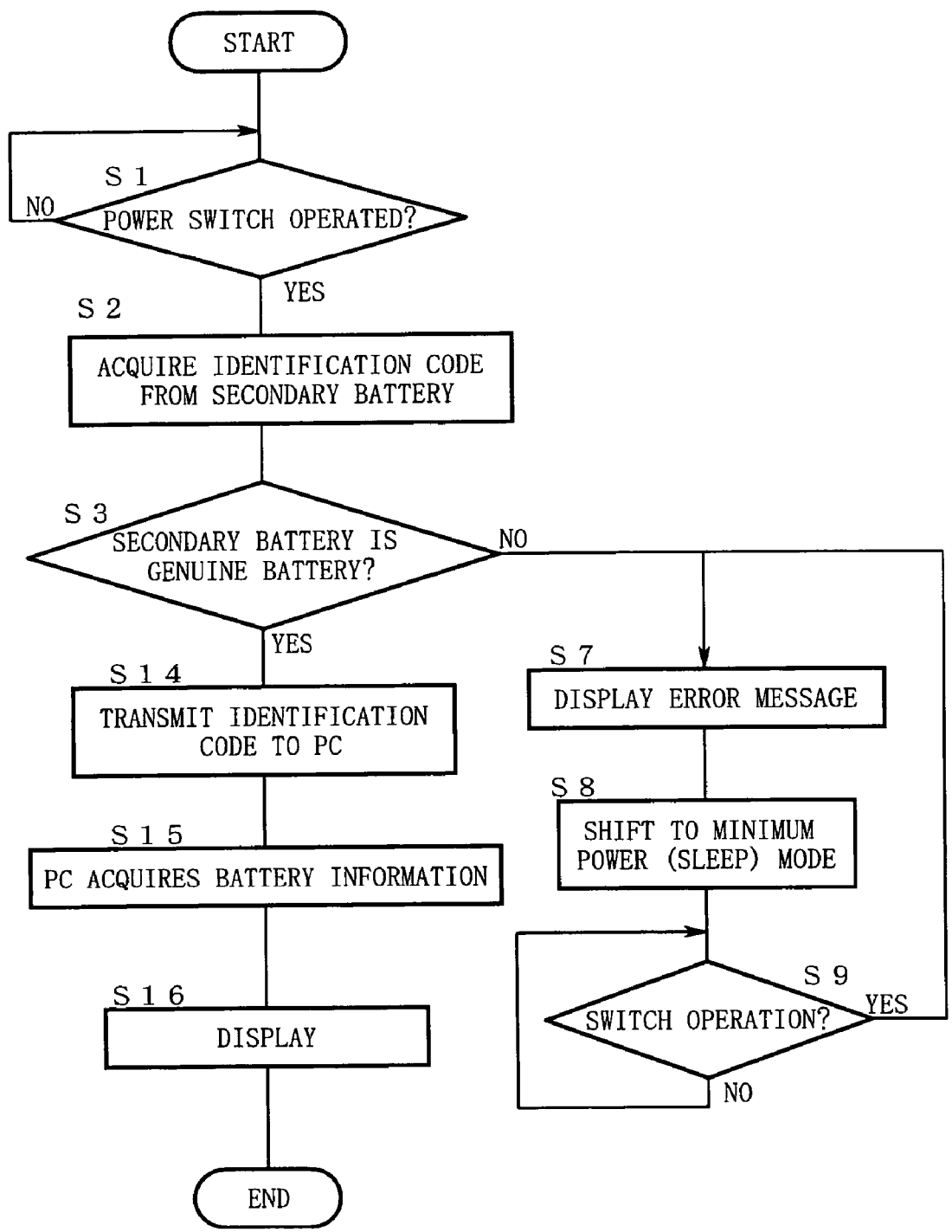
FIG. 3 is a flowchart showing a second operational example of the embodiment shown in FIG. 1.

FIG. 3 is a flowchart showing a second operational example of the embodiment shown in FIG. 1. In the second operational example, the battery information on the secondary battery attached to the electronic camera 100 is displayed on the personal computer 300.

The operational example shown in FIG. 3 is different from the operational example shown in FIG. 2 in portions in steps S4 to S6 in FIG. 2 and steps S14 to S16 in FIG. 3. Since the other portions are the same, the description thereof is omitted.

In step S3 shown in FIG. 3, if it is determined that the secondary battery 200 is the genuine battery, the operation proceeds to step S14.

In step S14, the main CPU 109 transmits the identification code to the personal computer 300. Incidentally, the personal computer is denoted as PC in FIG. 3.

In step S15, the main CPU 109 transmits the battery information which is acquired regularly to the personal computer 300 (See step S5 in FIG. 2).

In step S16, the personal computer 300 receives the battery information and displays a state of the secondary battery 200 based on the received battery information.

According to the embodiment shown in FIG. 1 and FIG. 3, when the secondary battery being the genuine battery is attached, it becomes possible to display the state of the secondary battery 200 on the personal computer 300.

Figure 4:
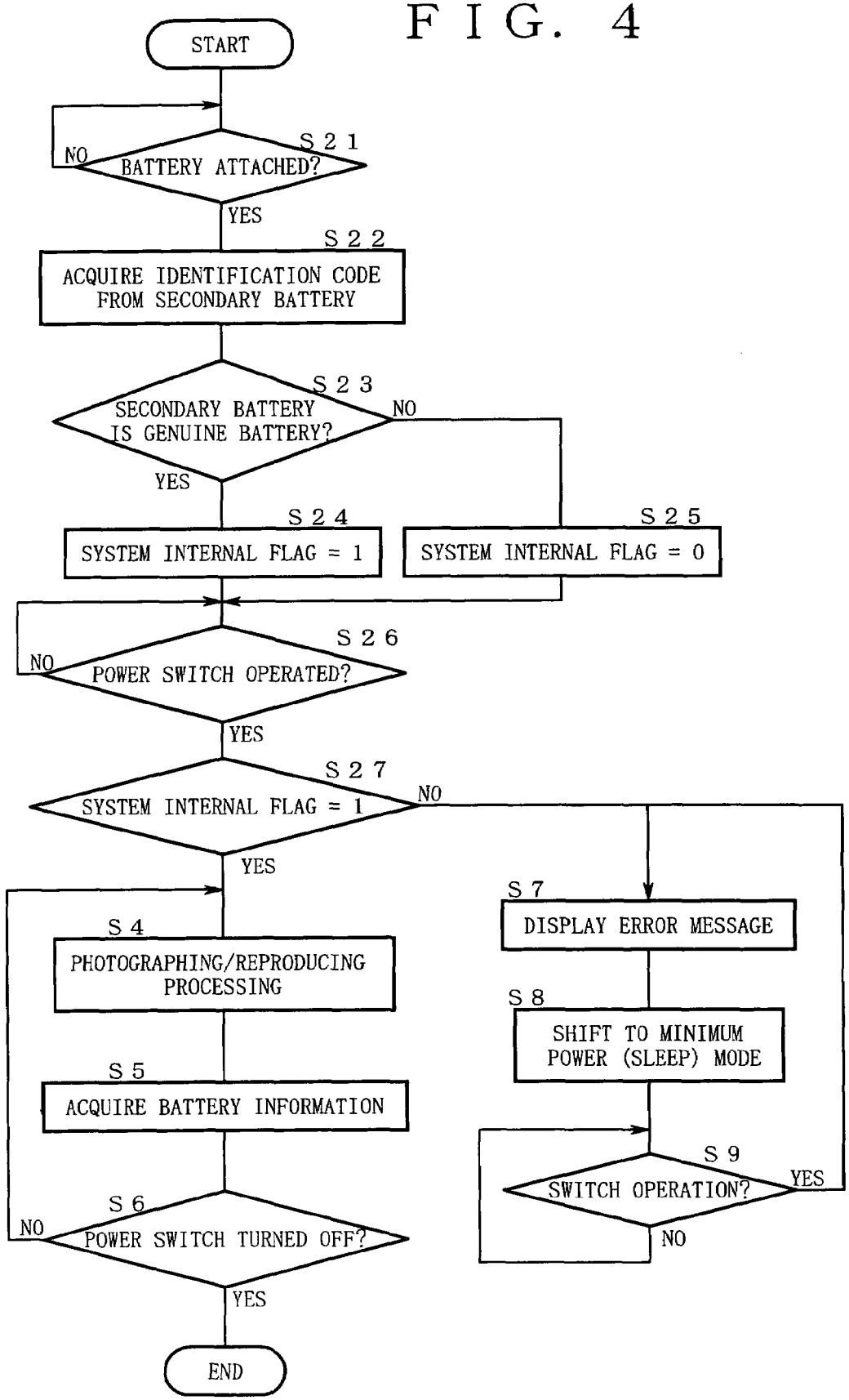
FIG. 4 is a flowchart showing a third operational example of the embodiment shown in FIG. 1.

FIG. 4 is a flowchart showing a third operational example of the embodiment shown in FIG. 1. The third operational example shown in FIG. 4 is different from the first operational example shown in FIG. 2 in that the main CPU 109 acquires the identification code and determines whether the secondary battery 200 is the genuine battery or the non-genuine battery when the secondary battery 200 is attached to the electronic camera 100.

Namely, in step S21 in FIG. 4, the main CPU 109 determines whether the secondary battery 200 has been attached to the electronic camera 100. It is possible to determine whether the secondary battery 200 has been attached, for example, by the CPU 109 checking a voltage of the terminal T1 of the electronic camera 100. More specifically, if the secondary battery 200 is not attached, the voltage of the terminal T1 of the electronic camera 100 is, for example, 0 V, and if the secondary battery 200 has been attached, the voltage of the terminal T1 of the electronic camera 100 becomes, for example, 8 V by connection to the terminal T4. When detecting the above voltage change, the main CPU 109 determines that the secondary battery 200 has been attached, and the operation proceeds to step S22. Incidentally, it is possible to determine whether the secondary battery 200 has been attached to the electronic camera 100 also by determining whether the communication control circuit 113 can communicate with the secondary battery 200 via the terminals T2 and T5. When determining that the secondary battery 200 is not attached, the main CPU 109 repeats the determination in step S21.

In step S22, the main CPU 109 acquires the identification code from the secondary battery 200.

In step S23, the main CPU 109 determines whether the secondary battery 200 is the genuine battery based on the identification code. If it is determined that the secondary battery 200 is the genuine battery, the operation proceeds to step S24, and if it is determined that the secondary battery 200 is the non-genuine battery, the operation proceeds to step S25.

In step S24, a system internal flag provided on the electronic camera 100 side is set to flag "1" which indicates that the secondary battery 200 is the genuine battery.

In step S25, the system internal flag provided on the electronic camera 100 side is set to flag "0" which indicates that the secondary battery 200 is the non-genuine battery.

In step S26, the main CPU 109 determines whether the power switch of the electronic camera 100 has been operated. If it is determined that the power switch has been operated and brought into an on-state, the operation proceeds to step S27. If it is determined that the power switch has not been operated, the determination in step S26 is repeated.

In step S27, the contents of the system internal flag provided on the electronic camera 100 side (already set in step S24 and S25) are checked. If the system internal flag is "1" which indicates the genuine battery, the operation proceeds to step S4. If the system internal flag is "0" which indicates the non-genuine battery, the operation proceeds to step S7.

Since the following process (steps S4 to S9) is the same as the process in steps S4 to S9 shown in FIG. 2, the description thereof is omitted.

Figure 5:
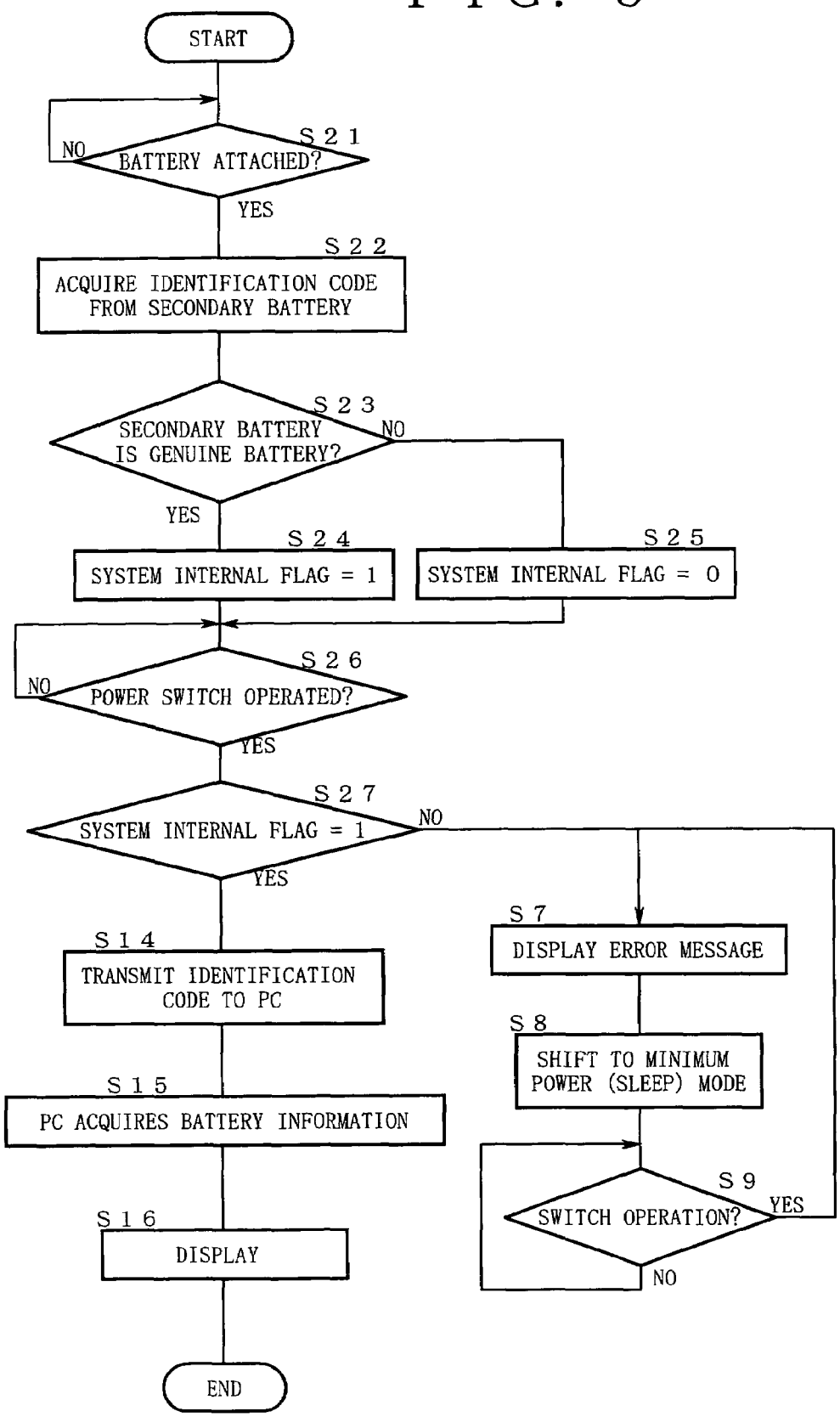
FIG. 5 is a flowchart showing a fourth operational example of the embodiment shown in FIG. 1.

FIG. 5 is a flowchart showing a fourth operational example of the embodiment shown in FIG. 1. The fourth operational example shown in FIG. 5 is different from the second operational example shown in FIG. 3 in that the main CPU 109 acquires the identification code and determines whether the secondary battery 200 is the genuine battery when the secondary battery 200 is attached to the electronic camera 100.

Namely, steps S21 to S27 shown in FIG. 5 are the same as steps S21 to S27 shown in FIG. 4, and steps S7 to S9 and steps S14 to S16 shown in FIG. 5 are the same as steps S7 to S9 and steps S14 to S16 shown in FIG. 3. Accordingly, the process in the flowchart shown in FIG. 5 is clear from the description about FIG. 3 and FIG. 4, so that the description thereof is omitted.

According to the respective operational examples shown in FIG. 4 and FIG. 5, the process of acquiring the identification code from the secondary battery 200 is limited to when the secondary battery 200 is attached to the electronic camera 100, so that the risk of leakage of the identification code to the outside can be reduced.

Further, according to the respective operational examples shown in FIG. 4 and FIG. 5, the need for identifying the genuine battery or the non-genuine battery every time the power switch is turned on is eliminated, which can contribute to reduced load at the time of starting and reduced starting time when the electronic camera 100 is started.

In the above, the description is given on the electronic camera as an example, but the present invention is not limited thereto, and can be applied to any device as long as the device is an electronic device to which the secondary battery is attached.

The invention is not limited to the above embodiments and various modifications may be made without departing from the spirit and scope of the invention. Any improvement may be made in part or all of the components.

What is claimed is:

1. An electronic device system having a detachable and chargeable secondary battery, the device system comprising:
   a secondary battery determination part which determines whether said secondary battery is a genuine battery, which is designed appropriate for said electronic device, in accordance with unique identification information output from a controller of said second battery;
   a message output part which outputs an error message when said secondary battery determination part determines that said secondary battery is not the genuine battery;
   a normal control part which allows said electronic device to operate normally when said secondary battery determination part determines that said secondary battery is the genuine battery; and
   a minimum power mode shifting part which shifts the operation of said electronic device to a minimum power mode when said secondary battery determination part determines that said secondary battery is not the genuine battery, wherein:
   said minimum power mode shifting part accepts only switch operation processing during the minimum power mode; and
   said message output part outputs the error message when the switch operation processing is accepted during the minimum power mode.

2. The electronic device system according to claim 1, wherein
   said secondary battery determination part detects a state of said secondary battery at regular periods.

3. An electronic camera system having a detachable and chargeable secondary battery, the camera system comprising:
   a secondary battery determination part which determines whether said secondary battery is a genuine battery which is designed appropriate for said electronic camera in accordance with unique identification information output from a controller of said secondary battery;
   a message output part which outputs an error message when said secondary battery determination part determines that said secondary battery is not the genuine battery;
   a normal control part which allows said electronic camera to operate normally when said secondary battery determination part determines that said secondary battery is the genuine battery; and
   a minimum power mode shifting part which shifts the operation of said electronic camera to a minimum power mode when said secondary battery determination part determines that said secondary battery is not the genuine battery, wherein:
   said minimum power mode shifting part accepts only switch operation processing during the minimum power mode; and
   said message output part outputs the error message when the switch operation processing is accepted during the minimum power mode.

4. The electronic camera system according to claim 3, wherein
   said secondary battery determination part detects a state of said secondary battery at regular periods.

5. The electronic camera system according to claim 4, wherein:
   said secondary battery determination part transmits the detected state of said secondary battery to a personal computer; and
   said personal computer displays the detected state of said secondary battery.

* * * * *